J. LITTLE.
Lath-Sawing Machine.
No. 212,713.   Patented Feb. 25, 1879.
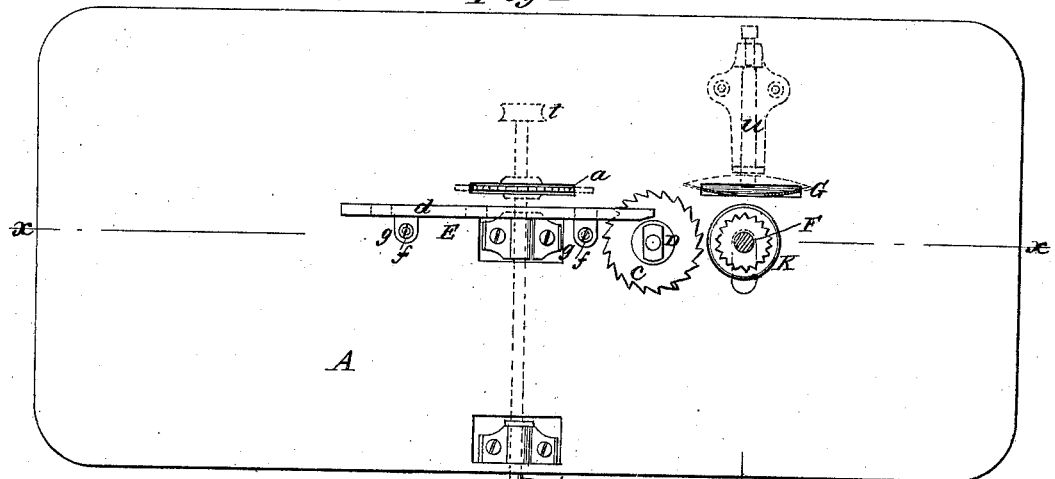
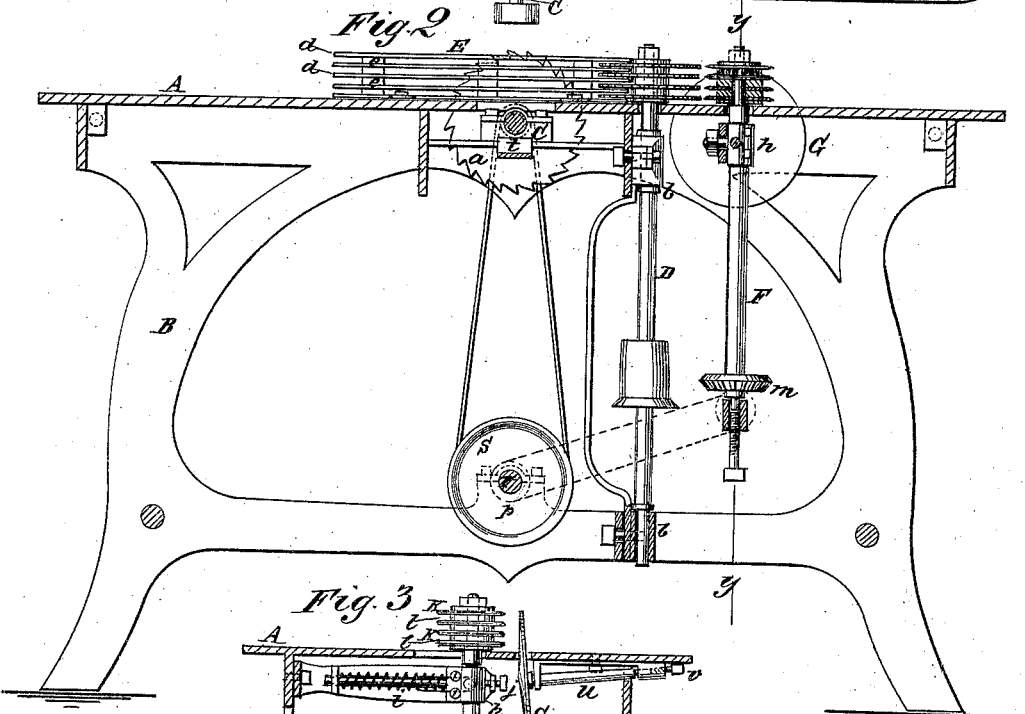
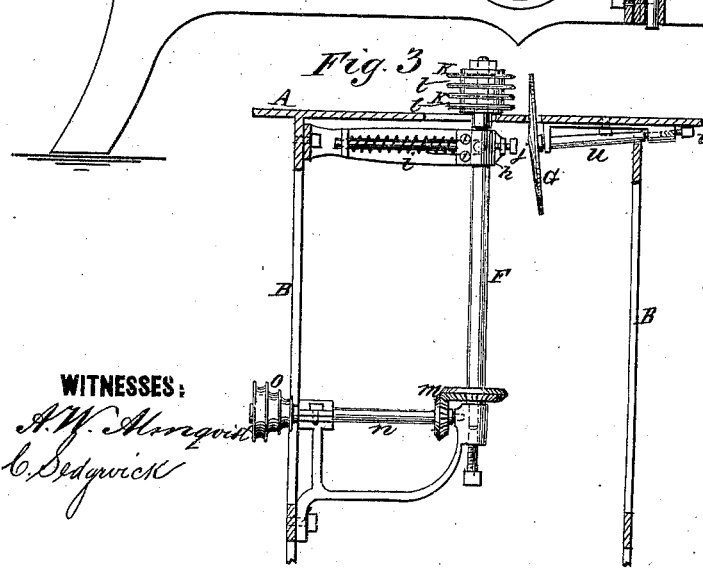
WITNESSES:
INVENTOR:
J. Little
BY
ATTORNEYS.
N. PETERS, PHOTO-LITHOGRAPHER, WASHINGTON, D. C.

UNITED STATES PATENT OFFICE.

JAMES LITTLE, OF EVANSVILLE, INDIANA.

IMPROVEMENT IN LATH-SAWING MACHINES.

Specification forming part of Letters Patent No. 212,713, dated February 25, 1879; application filed July 18, 1878.

*To all whom it may concern:*

Be it known that I, JAMES LITTLE, of Evansville, in the county of Vanderburg and State of Indiana, have invented a new and Improved Lath Bolting and Sawing Machine, of which the following is a specification:

Figure 1 is a top view. Fig. 2 is a longitudinal section on line $x\,x$ in Fig. 1. Fig. 3 is a transverse section on line $y\,y$ in Fig. 2.

Similar letters of reference indicate corresponding parts.

My invention relates to machinery for bolting and sawing lath, the object being to provide a machine that shall at one operation cut a bolt from a slab or plank and cut the bolt into lath of a uniform size.

Referring to the drawings, A is the bed or table of the machine, supported on the frame B. C is a saw-mandrel, having journal-boxes arranged on the frame in the usual manner, and carrying a saw, $a$, that projects upward through the table A. D is a vertical mandrel, having boxes $b$ attached to portions of the frame B, and which projects upward through the table A, and placed in such a position in relation to the mandrel C that the kerf made by the saws $c$ on the mandrel D intersect the kerf made by the saw $a$ at right angles. The saws $c$ are separated by washers having the thickness of a lath, and the lower one is placed the thickness of a lath above the table.

An adjustable gage, E, composed of strips of iron, $d$, attached together with the intervening blocks $e$, is secured to the table by screws $f$, that pass through slotted ears $g$, attached to the gage into the table. This gage is arranged on the table with its face parallel with the face of the saw $a$, and with the projecting fingers formed by a continuation of the bars composing the gage placed between the saws $c$. The mandrels C and D are provided with pulleys and are driven by belts, in the usual way.

F is a vertical shaft, resting at the bottom in an adjustable step, and supported at the top by a sliding journal-box, $h$, that is pressed by a spring, $i$, and whose motion is limited by a set-screw, $j$, that passes through an ear on the bracket that supports the sliding journal-box. The shaft is placed parallel to the mandrel D, and in such a position in relation to it that the disks or spreaders, $k$, carried by it will follow the kerf made by the saws $c$, and the serrated collars $l$ will press upon the edges of the lath.

The shaft F receives its motion through the bevel-wheels $m$, shaft $n$, cone-pulleys $o\,p$, shaft $r$, pulley $s$, and pulley $t$, secured to the end of the mandrel C.

G is a beveled disk projecting upward through the table and secured to the inclined shaft $u$, and located in front of the shaft F, in line with the saw $a$, so that it may follow the kerf of the saw $a$, and act not only as a spreader, but also as a support for the lath as they are pressed by the serrated collars $l$. The shaft of the disk G is adjusted longitudinally by a screw, $v$.

The operation of the machine may be described as follows: The plank or slab is placed against the gage, and, the machine being in motion, the saw on the horizontal mandrel cuts from the plank a bolt which has the thickness of the width of the lath. As the bolt advances, it is cut by the saws on the vertical mandrel into lath. The serrated collars on the vertical feeding-shaft draw the lath through the machine, and the disks on the vertical and inclined shafts follow the saw-kerfs and spread them, thus relieving the saws from all pinching.

The advantages claimed for this invention are, that lath can be more rapidly cut than by other machines now in use, and the machine may be used for cutting rectangular strips of any description from wood in a much better manner and in less time than by passing the wood twice through the ordinary machine.

Having thus described my invention, I claim as new and desire to secure by Letters Patent—

1. The combination of the vertical shaft F, sliding journal-box $h$, spring $i$, disks $k$, and serrated collars $l$, substantially as shown and described.

2. The combination of the shaft F, disks $k$, collars $l$, beveled disk G, and inclined shaft $u$, substantially as shown and described.

JAMES LITTLE.

Witnesses:
 JONAS SMITH,
 WM. F. SPEER.